United States Patent
Rajpal et al.

(10) Patent No.: US 10,452,526 B2
(45) Date of Patent: Oct. 22, 2019

(54) MACHINE LEARNING FOR CONSTRAINED MUTATION-BASED FUZZ TESTING

(71) Applicant: Microsoft Technology Licensing, LLC, Redmond, WA (US)

(72) Inventors: Mohit Rajpal, Bartlett, IL (US); William Blum, Bellevue, WA (US); Rishabh Singh, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 276 days.

(21) Appl. No.: 15/636,132

(22) Filed: Jun. 28, 2017

(65) Prior Publication Data

US 2018/0365139 A1    Dec. 20, 2018

Related U.S. Application Data

(60) Provisional application No. 62/520,173, filed on Jun. 15, 2017.

(51) Int. Cl.
*G06F 11/36*    (2006.01)
*G06F 21/57*    (2013.01)
(Continued)

(52) U.S. Cl.
CPC ...... *G06F 11/3692* (2013.01); *G06F 11/3684* (2013.01); *G06F 11/3688* (2013.01);
(Continued)

(58) Field of Classification Search
CPC ............. G06F 11/3688; G06F 11/3672; G06F 11/3684; G06F 11/3692
See application file for complete search history.

(56) References Cited

U.S. PATENT DOCUMENTS

| | | |
|---|---|---|
| 8,819,834 B2 | 8/2014 | Petrica et al. |
| 9,098,621 B2 | 8/2015 | Zheng et al. |

(Continued)

FOREIGN PATENT DOCUMENTS

CN    104375942 A    2/2015

OTHER PUBLICATIONS

Beterke, Fabian, "Distributed Evolutionary Fuzzing with Evofuzz", In Sicherheit Lecture Notes in Informatics, Jan. 1, 2016, pp. 23-32.

(Continued)

*Primary Examiner* — Jigar P Patel
(74) *Attorney, Agent, or Firm* — Schwegman Lundberg & Woessner, P.A.

(57) ABSTRACT

Techniques for constrained mutation-based fuzzing are described. Machine accesses an input file of code for testing. Machine performs multiple runs of a fuzzing algorithm using the input file and the code. Each run includes: performing a mutation of one or more bytes of the input file and determining which parts of the code were executed when the code was run with the mutated input file. Machine stores, for each run, an indication of whether the mutation caused execution of a portion of the code which was not executed prior to the mutation. Machine generates heatmap of the input file based on the stored indications. The heatmap maps each of the bytes in the input file to a value indicating whether the mutation of the byte caused execution of the portion of the code for testing which was not executed prior to the mutation. Machine tailors fuzzing algorithm based on heatmap.

19 Claims, 5 Drawing Sheets

(51) Int. Cl.
  G06N 20/00 (2019.01)
  G06N 5/04 (2006.01)
(52) U.S. Cl.
  CPC .......... *G06F 21/577* (2013.01); *G06N 5/048* (2013.01); *G06N 20/00* (2019.01); *G06F 11/3676* (2013.01)

(56) References Cited

U.S. PATENT DOCUMENTS

| | | | |
|---|---|---|---|
| 2008/0301813 A1* | 12/2008 | Neystadt | G06F 11/3672 726/25 |
| 2011/0302455 A1 | 12/2011 | Thomas et al. | |
| 2017/0272360 A1* | 9/2017 | Dunn | H04L 69/22 |

OTHER PUBLICATIONS

"International Search Report and Written Opinion Issued in PCT Application No. PCT/US2018/034256", dated Aug. 28, 2018, 16 Pages.

Sparks, et al., "Automated Vulnerability Analysis: Leveraging Control Flow for Evolutionary Input Crafting", In Proceedings of the 23rd Annual Computer Security Applications Conference, Dec. 10, 2007, pp. 477-486.

Rawat, et al., "VUzzer: Application-aware Evolutionary Fuzzing", In Proceedings of the Network and Distributed System Security Symposium, Feb. 26, 2017, pp. 1-14.

Moerman, Joshua, "Makes it work with plain latex", https://gitlab.science.ru.nl/moerman/rers-2016/blob/ef1b08e123a9179464b268095425c731a62fea4a/report/main.tex, Retrieved on: Jun. 7, 2017, 9 pages.

Shu, et al., "Detecting Communication Protocol Security Flaws by Formal Fuzz Testing and Machine Learning", In International Conference on Formal Techniques for Networked and Distributed Systems, Jun. 10, 2008, pp. 299-304.

Havrikov, Nikolas, "Efficient Fuzz Testing Leveraging Input, Code, and Execution", In Proceedings of the 39th International Conference on Software Engineering Companion, May 20, 2017, pp. 417-420.

Tsankov, et al., "Semi-valid Input Coverage for Fuzz Testing", In Proceedings of the International Symposium on Software Testing and Analysis, Jul. 15, 2013, 11 pages.

Bock, Hanno, "Fuzzing with american fuzzy lop", https://lwn.net/Articles/657959/, Published on: Sep. 22, 2015, 7 pages.

Bozic, Josip, "Model-based Testing—From Safety to Security", In Proceedings of the 9th Workshop on Systems Testing and Validation, Oct. 24, 2012, pp. 1-8.

Zimmermann, et al., "Tavor", https://github.com/zimmski/tavor, Retrieved on: Jun. 7, 2017, 24 pages.

"American fuzzy lop (2.42b)", http://lcamtuf.coredump.cx/afl, Retrieved Date: Jun. 13, 2017, 4 pages.

"Technical details afl-fuzz", Technical "whitepaper" for afl-fuzz, Retrieved Date: Jun. 13, 2017, 6 pages.

* cited by examiner

MACHINE LEARNING FOR CONSTRAINED MUTATION-BASED FUZZ TESTING

PRIORITY CLAIM

This application claims priority to U.S. Provisional Patent Application No. 62/520,173, filed on Jun. 15, 2017, and titled "MACHINE LEARNING FOR CONSTRAINED MUTATION-BASED FUZZ TESTING," the entire disclosure of which is incorporated herein by reference.

BACKGROUND

A frizzing algorithm is used to test software code by executing the code with various versions (mutations) of an input file and determining whether those versions of the input file cause the code to crash or to execute properly. Traditional fuzzing algorithms are parametrized by many parameters such as number of mutations, choosing locations for mutations, types of mutations etc., which are typically assigned random values.

BRIEF DESCRIPTION OF THE DRAWINGS

Some embodiments of the technology are illustrated, by way of example and not limitation, in the figures of the accompanying drawings.

SUMMARY

Figure 1:
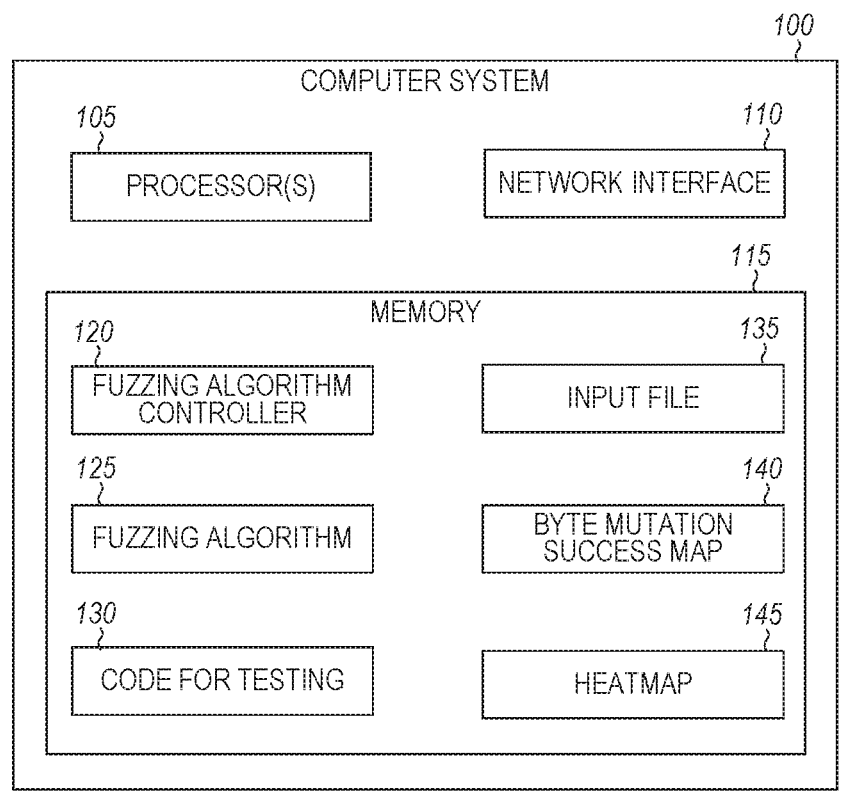
FIG. 1 is a block diagram illustrating an example computer system in which constrained mutation-based fuzz testing may be implemented, in accordance with some embodiments

The present disclosure generally relates to machines configured for executing fuzzing algorithms to test code, including computerized variants of such special-purpose machines and improvements to such variants, and to the technologies by which such special-purpose machines become improved compared to other special-purpose machines that provide technology for executing fuzzing algorithms to test code. In particular, the present disclosure addresses systems and methods for using machine learning techniques for constrained mutation-based fuzz testing.

DETAILED DESCRIPTION

The present disclosure describes, among other things, methods, systems, and computer program products that individually provide various functionality. In the following description, for purposes of explanation, numerous specific details are set forth in order to provide a thorough understanding of the various aspects of different embodiments of the present disclosure. It will be evident, however, to one skilled in the art, that the present disclosure may be practiced without all of the specific details.

As noted above, techniques for optimizing the parameters for fuzzing algorithms based on previous executions of the algorithms may be desirable. Techniques for optimizing parameters for fuzzing algorithms may be desirable to make fuzzing algorithms more efficient. According to some aspects, the subject technology provides techniques for optimizing fuzzing algorithms. In general, a fuzzing algorithm receives an input file for code for testing, and mutates (e.g., changes one or more bytes of) the input file to determine if the mutation causes the code to crash. The information about which versions of the input file cause the code to crash is provided to developers for fixing the code. Some problems in current fuzzing algorithms include identifying which bytes in the input tile should be mutated in order to increase the likelihood that a version of the input file that causes the code to crash will be discovered.

Throughout this document, the subject technology is described as being implemented with a single input tile. However, the subject technology may be implemented with multiple input files, or input in a form other than a tile. Unless explicitly stated otherwise, the phrase "input file" includes multiple files or input in form(s) different from a file.

Some aspects of the subject technology are directed to constrained mutation-based fuzz testing. Fuzz testing or "fuzzing" is the process of supplying a target executable with maliciously crafted input to cause it to crash, hang, or otherwise break. A target program is "fuzzable" if it accepts arbitrary input from an untrusted source. According to some aspects, a machine accesses an input file of code for testing, the input file comprising a plurality of bytes. The machine performs a plurality of runs of a fuzzing algorithm using the input file and the code for testing. Each run includes performing a mutation of at least one byte of the input file and determining which parts of the code under test were executed when the code was run with the mutated input file. The machine stores, for each run of the plurality of runs of the fuzzing algorithm, an indication of whether the mutation caused execution of a portion of the code for testing which was not executed prior to the mutation. The machine generates a heatmap of the input file based on the stored indications. The heatmap maps each of the plurality of bytes in the input file to a value indicating whether the mutation of the byte caused execution of the portion of the code for testing which was not executed prior to the mutation. The machine tailors the fuzzing algorithm based on the heatmap. The machine executes the tailored fuzzing algorithm to identify one or more versions of the input file for which the code for testing crashes. The machine provides, as a digital transmission, indicia of the one or more versions of the input tile for which the code for testing crashes. In some cases, the digital transmission is provided to a client device or a display unit for display thereat.

Fuzz testing is one widely used automated testing technique that has been successful in automatically finding security vulnerabilities in complex software. The key idea in fuzzing is to continuously generate new inputs to stress-test a software under test to discover unexpected behaviors such as crashes, buffer overflows, or exceptions. Traditionally, the fuzzing techniques start with a set of seed input files, and then continuously transform these files to generate new promising inputs either by random mutations, constraint-solving, or using a set of manual heuristics. Since the input formats can be quite complex, it typically requires millions of mutations to generate a few meaningful new inputs, and therefore it can also be seen as a huge search problem to identify a good set of mutations that would lead to higher code coverage and crashes. In some aspects, the subject technology explores a learning technique that uses neural networks to learn patterns in the inputs based on past fuzzing explorations to guide the future fuzzing explorations.

There are three main types of fuzzing: i) Blackbox fuzzing, ii) Whitebox fuzzing, and iii) Greybox fuzzing. The blackbox fuzzers treat the binary under test as a black box with no internal inspection inside the binary. The whitebox fuzzers on the other hand also analyze the source code of the binary to generate input mutations to specifically target certain code fragments. The greybox fuzzers are somewhere in between where they perform limited source code inspection such as computing code coverage. Although all fuzzing techniques have different pros and cons, greybox fuzzing techniques based on random mutations have been used in the real-world because of their simplicity and efficiency.

FIG. 1 is a block diagram illustrating an example computer system 100 in which constrained mutation-based fuzz testing may be implemented, in accordance with some embodiments. The computer system 100 may include a single computer or multiple computers. As shown, the computer system 100 includes processor(s) 105, a network interface 110, and a memory 115. The processor(s) execute instructions stored in a computer-readable medium or a machine-readable medium (such as the memory 115) to receive input(s), process data stored in the memory 115 or other computer-readable medium or machine-readable medium, and provide output(s). The processor(s) may include a central processing unit (CPU), a graphics processing unit (GPU), and the like. The network interface 110 allows the computer system 100 to communicate via a. network (e.g., the Internet, an intranet, a local area network, a wide area network, a wired network, a wireless network, and the like). The network interface 110 allows the computer system 100 to, among other things, receive input(s) and provide output(s) via the network. The network interface may include one or more network interface cards (NICs). The memory 115 stores data or instructions. The memory 115 may include long-term storage or short-term storage. As shown, the memory includes a fuzzing algorithm controller 120, a fuzzing algorithm 125, code for testing 130, an input file 135, a byte mutation success map 140, and a heatmap 135.

The code for testing 130 may include any code which may be executed by the processor(s) 105 and tested using a fuzzing algorithm. The code for testing 130 takes as input the input file 135 and processes the input file to generate an output. The input file 135 may be of any file type, such as PDF (portable document format), JPG, PNG, and the like. The code for testing 130 may be an application for processing (e.g., displaying, editing, or transmitting) files of the type associated with the input file 135. The input file 135 may include multiple bytes.

The fuzzing algorithm 125 takes the input file 135 for code for testing 130, and mutates the input file 135 to determine if the mutation causes the code 130 to crash. The fuzzing algorithm 125 mutates one or more bytes in the input file 135 to cause unexpected behavior in an execution of the code for testing 130. The information about which versions of the input file cause the code 130 to crash is provided to developers for fixing the code. In some examples, the fuzzing algorithm 125 is a greybox or blackbox fuzzer which generates input, code coverage pairs. The fuzzing algorithm 125 randomly mutates bytes in the input file 135 and identifies mutations that cause the code 130 to crash.

Figure 2A:
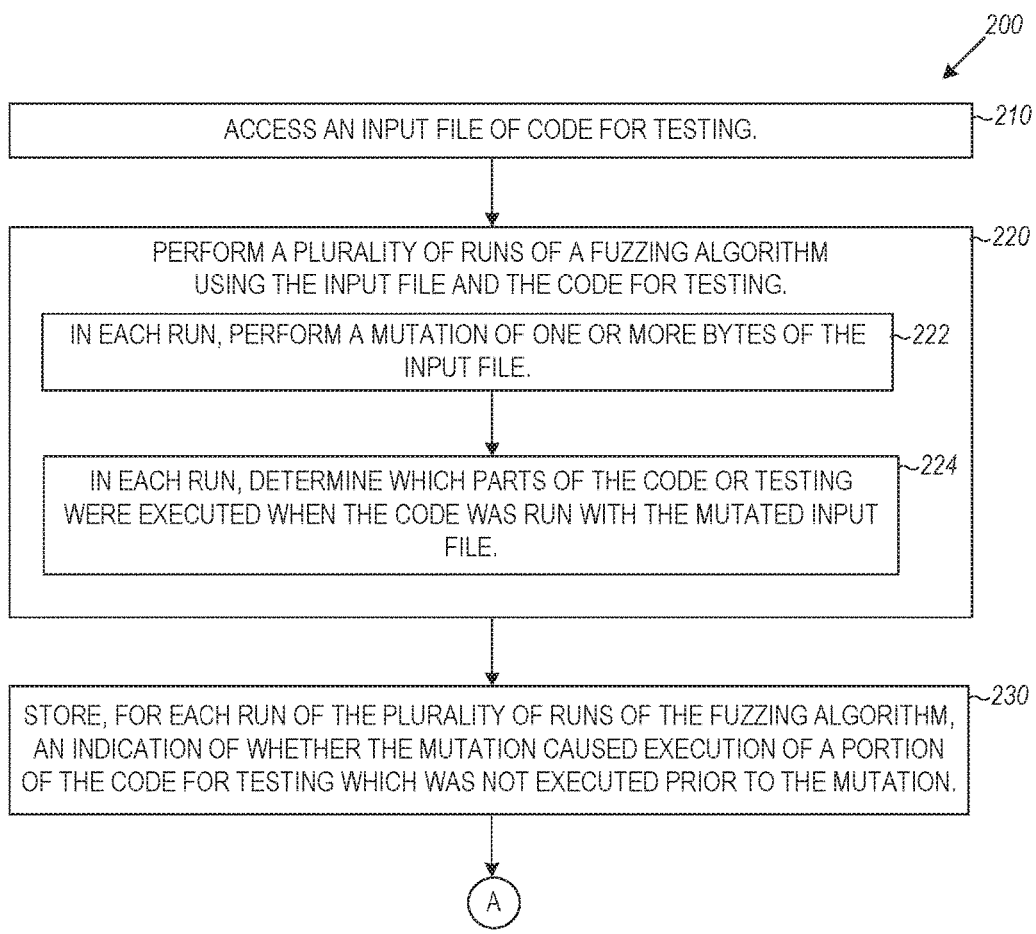
FIGS. 2A-2B are a flow chart illustrating an example method for constrained mutation-based fizz testing, in accordance with some embodiments.
Figure 2B:
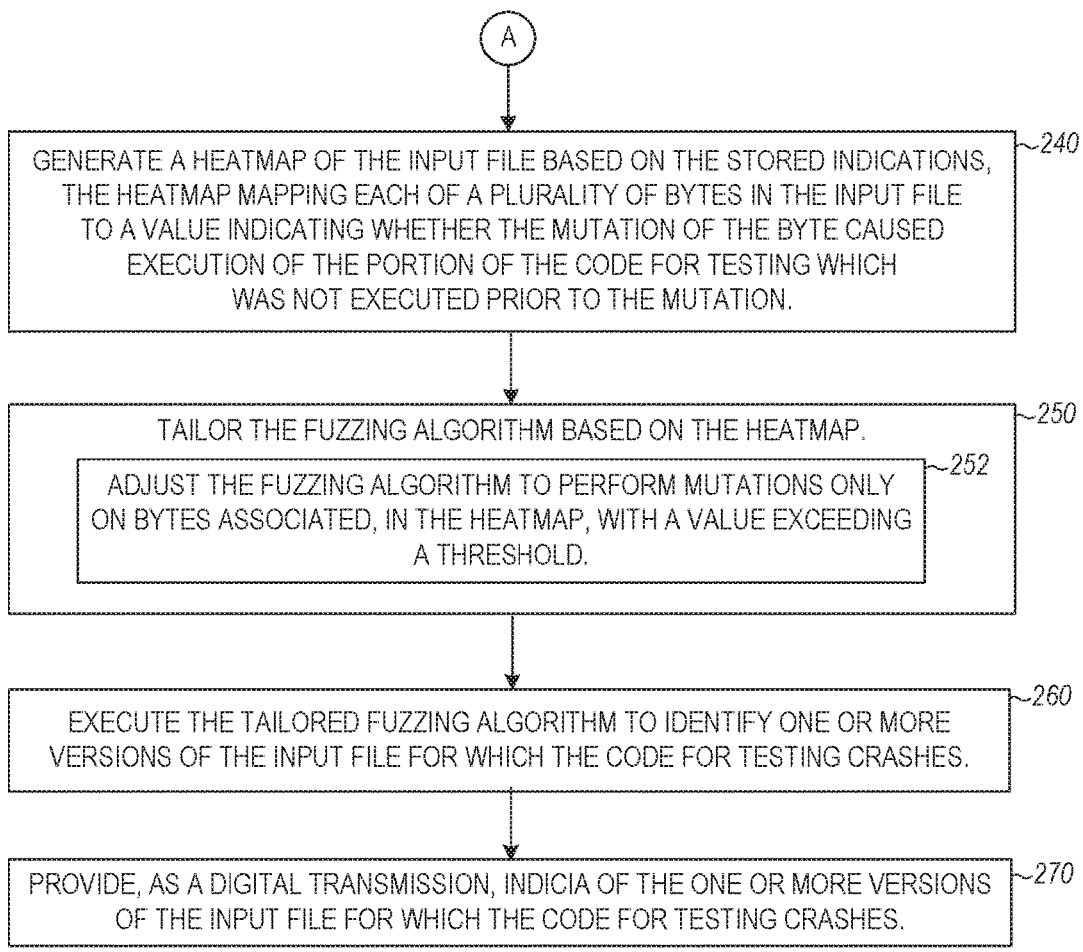

One example of a fuzzing algorithm, which may be used as the fuzzing algorithm 125 with some aspects of the subject technology, is AFL (American Fuzzy Lop), which is an open source random fuzzer, The fuzzing algorithm controller 120, when executed by the processor(s) 105, causes the processor(s) 105 to access the input file 135 of code for testing 130. The processor(s) 105 perform multiple runs of the fuzzing algorithm 125 using the input file 135 and the code for testing 130. Each run includes performing a mutation of one or more bytes of the input file 135 and determining which parts of the code for testing 130 were executed when the code was run with the mutated input file 135. The processor(s) 105 store, in the byte mutation success map 140 and for each run of the plurality of runs of the fuzzing algorithm 125, an indication of whether the mutation caused execution of a portion of the code for testing 130 which was not executed prior to the mutation, The processor(s) 105 generate, based on the byte mutation success map 140, a heatmap 145 of the input file. In some examples, the heatmap 145 corresponds to the byte mutation success map 140 or some modification thereof. The heatmap 145 maps each of the plurality of bytes in the input file 135 to a value indicating whether the mutation of the byte caused execution of the portion of the code for testing 130 which was not executed prior to the mutation. The processor(s) 105 tailor the fuzzing algorithm 125 based on the heatmap 145. The processor(s) 105 execute the tailored fuzzing algorithm 125 to identify one or more versions of the input file 135 for which the code for testing 130 crashes. The processor(s) 105 provide, as a digital transmission (e.g., via the network interface 110 or to a display unit coupled with the computer system 100), indicia of the one or more versions of the input file 135 for which the code for testing 130 crashes. In some cases, the digital transmission is provided to a display unit or another machine for display thereat. More details of some examples of the operation of the fuzzing algorithm controller 120 are provided in conjunction with FIGS. 2A-2B, FIGS. 2A-2B are a flow chart illustrating an example method 200 for constrained mutation-based fuzz testing, in accordance with some embodiments. As described herein, the method 200 may be implemented in the computer system 100 shown in FIG. 1. For example, during the implementation of the method 200, the processor(s) 105 may be running the frizzing algorithm controller 120. However, the method 200 is not limited to being implemented in the computer system 100 and may be implemented in other system(s) having different component(s).

As shown in FIG. 2A, the method 200 begins at operation 210 where the computer system 100 accesses an input file 135 of code for testing 130. The input file 135 may include a plurality of bytes.

At operation 220, the computer system 100 performs a plurality of runs of the fuzzing algorithm 125 using the input file 135 and the code for testing 130. In each run, at operation 222, the computer system 100 performs a mutation of one or more bytes of the input file 135. In each run, at operation 224, the computer system 100 determines which parts of the code for testing were executed when the code 130 was run with the mutated input file 135.

At operation 230, the computer system 100 stores, for each run of the plurality of runs of the fuzzing algorithm, an indication of whether the mutation caused execution of a portion of the code for testing 130 which was not executed prior to the mutation. For example, a code execution tracking application may be used to track the parts of the code for testing that are executed. In some examples, the indications are stored in the byte mutation success map 140, which maps each byte of the input file 135 to an indication of the number of times its mutation led to additional code being executed and the number of times its mutation did not lead to additional code being executed.

As shown in FIG. 2B, at operation 240, the computer system 100 generates a heatmap 145 of the input file 135 based on the stored indications. The heatmap 145 maps each of the plurality of bytes in the input file 135 to a value indicating whether the mutation of the byte caused execution of the portion of the code for testing 130 which was not executed prior to the mutation. In some examples, the heatmap 145 may indicate TRUE or 1 if, in at least one instance, the mutation of the byte caused execution of the portion of the code for testing which was not executed prior to the mutation, and FALSE or 0 otherwise.

In some examples, the value in the heatmap 145 indicating whether the mutation of the byte caused execution of the portion of the code for testing 130 which was not executed prior to the mutation corresponds to a proportion, of runs where the byte had the mutation, which caused execution of the portion of the code for testing 130 which was not executed prior to the mutation. The proportion may be determined using the byte mutation success map 140. The heatmap 145 may be generated based on the byte mutation success map 140. In accordance with some examples, the heatmap 145 is a matrix identifying each byte of the input file 135 and the value indicating whether the mutation of that byte caused execution of the portion of the code for testing 130 which was not executed prior to the mutation.

At operation 250, the computer system 100 tailors the frizzing algorithm 125 based on the heatmap 145. For example, as shown at operation 252, the computer system 100 adjusts the fuzzing algorithm 125 to perform mutations only on bytes associated, in the heatmap 145, with a value exceeding a threshold. Alternatively, the computer system 100 adjusts the frizzing algorithm 125 to perform mutations only on bytes associated, in the heatmap 145, with a non-zero value or a TRUE value. In some cases, the computer system 100 provides, as a digital transmission, an output of the tailored frizzing algorithm. In some cases, the digital transmission is provided to a display unit or another computer for display thereat.

At operation 260, the computer system 100 executes the tailored fuzzing algorithm 125 to identify one or more versions of the input file 135 for which the code for testing 130 crashes. At operation 270, the computer system 100 provides, as a digital transmission, indicia of the one or more versions of the input file 135 for which the code for testing 130 crashes. The digital transmission may be provided, for example, to a display unit coupled with the computer system 100 or to another machine via a network to which the computer system 100 connects via the network interface 110.

Constrained mutation-based fuzz testing limits the search space of fuzzing while optimizing code coverage. The constrained mutation-based fuzzing constrains the search space by focusing on input, code coverage pairs. According to some aspects, the heatmap and the machine learning model are provided. Fuzzing can be thought of as a discrete optimization problem with code coverage being the variable being optimized. In some examples, one possible goal of fuzzing is to maximize code coverage (the objective function) while limiting the number of total executions (the constraints) to a suitable minimum.

In some aspects of the subject technology, the size of the search space of the above discrete optimization problem is reduced, while maintaining reachability of optimal objective function value. This may transform the problem into a simpler, more tractable problem. This may yield higher objective function values subject to the same constraints.

Some aspects reduce the size of the search space by focusing mutations on only specific bytes in each input seed file. Some aspects ignore portions of the input file that are believed not to affect code coverage. By constraining the possible mutations, some aspects are able to more thoroughly optimize within the limited search space. This approach may result in higher code coverage.

In some examples, fuzz testing is challenging because crafting malicious input is difficult. For a fixed input and executable, most modifications to the input will cause no discernible change in execution behavior. This is because most of the input is indeed data for which all possible values are acceptable. The "interesting" parts of the input are typically non-data sections such as headers, checksums, magic values, or length fields. Modifying some or all of these bytes is likely to yield malicious input which causes the target program to misbehave unexpectedly.

Some aspects of the subject technology are directed to intelligently exploring the input space to maximize the ratio of malicious inputs that is generated. Unlike previous formulations, some aspects of the subject technology approach the above problem as a discrete optimization problem that may be solved through quantitative approaches.

However, "malicious input" is ill defined and difficult to optimize. Some aspects of the subject technology attempt to optimize a related metric, code coverage. Code coverage is defined as the portion of the code that is executed by at least one test case. In some cases, optimizing code coverage is feasible, and may be used to discover most malicious inputs which cause the binary to misbehave.

There are many conventional approaches to fuzz testing. Fuzzers, programs which fuzz test binaries, come in many flavors. They can be very simple, to very intelligent. The typical fuzzing scenario involves supplying a binary executable, and a set of input seed files to the fuzzer. These input seed files are possible inputs the binary could expect to parse. For example: if the binary is a PDF viewer, the seed files will contain many PDF documents exercising the various capabilities of the PDF format. The fuzzer's job is to mutate these seed files to cause unexpected behavior such as crashes, access violations, buffer overflows, and other exceptions in the binary.

A very simple fuzzer will randomly flip bits and bytes in each of the input seeds to cause unexpected behavior. This "random corruption" approach yields results because it is simple and efficient, and thus can be heavily parallelized. However, fuzzers can also be very intelligent.

SAGE®, a fuzzer developed by Microsoft Corporation in Redmond, Wash., operates backwards towards maximizing code coverage. Instead of exploring the input space, SAGE® explores the code coverage space. SAGE® begins by choosing some previously unreachable code block to explore. Next, by inspecting the assembly instructions of the binary, SAGE® formulates a set of satisfiability constraints necessitated to reach this code block. If the code block is theoretically reachable by some possible input, and the program itself is deterministic on the input, the reachability of this code block can be formulated as a set of satisfiability constraints on the input. These satisfiability constraints can be given to a SMT (satisfiability modulo theories) solver, to output an input which satisfies all the constraints. This algorithm is best illustrated with an example, shown in Algorithm 1, below.

| Algorithm 1 |
|---|
| ```
void top(char input[4])
{
    int cnt = 0;
    if(input[0] == 'b') cnt++;
    if(input[1] == 'a') cnt++;
    if(input[2] == 'd') cnt++;
    if(input[3] == '!') cnt++;
    if(cnt >= 4) crash( );
}
``` |

The code section of Algorithm 1 is difficult to test for simple fuzzers. This is because four separate "if" checks are required on the input prior to the crash being triggered. The four character input has $2^{32}$ possible configurations ($2^8$ possible symbols for each byte raised to the fourth power for four bytes), of which only one will trigger the crash. The probability of a simple fuzzer finding the crash by randomly flipping bits or bytes is incredibly low: about 1 in 4 billion.

However, SAGE® is able to find the crash very easily by examining the code itself As an example, first, SAGE® decides to explore the code block containing the crash( ) code. This requires the constraint of cnt>=4. This is dependent on 4 other blocks incrementing cnt. These blocks themselves have constraints on input[0], input[1], input[2], and input[3] respectively. These constraints are formalized and given to a SMT-solver. The solver is able to successfully resolve this set of constraints with the input "bad!" which triggers the crash code.

SAGE's® technology is able to reach more complex code paths by working backwards. This comes at a cost. Code inspection, constraint formulation, and constraint solving are inherently slower than random fuzzing. As such this fuzzing mechanism has different cost-benefit tradeoffs. Fuzzing with SAGE® can be more useful on code already fuzzed by a random fuzzer. Hall the "low-hanging" bugs are discovered by a random fuzzer, then a sophisticated intelligent fuzzer such as SAGE® can discover more nuanced bugs. Random fuzzers and "intelligent" fuzzers (e.g. SAGE®) are often used in conjunction due to their different tradeoffs. Another possible approach is to invest prudently in many fuzzing technologies to best cover as many scenarios as possible.

Some aspects of the subject technology improve random fuzzers by restricting which bits or bytes are randomly changed. According to some aspects, random fuzzers can be easily improved without any negative tradeoffs. One such approach is to constrain the portions of the input files which are modified. The idea behind this approach is that most of the input is data for which all possible values are valid. Some aspects of the subject technology attempt to identify which part of the input file is data. Then, some aspects can reliably ignore the portions of the input that are data while still maintaining identical code reachability. In other words, some aspects reduce the input space that must be explored, while guaranteeing that the optimal solution lies within the constrained set. This simplifies the problem exponentially.

The approach described above has several benefits. The benefits include: simplicity because the approach is simple to implement, and almost any fuzzer can be augmented with it; performance because the approach has low overhead; effective because it can reliably improve random fuzzers; and intuitivity because it is easy to understand.

Algorithm 2 provides a slight modification of Algorithm 1.

| Algorithm 2 |
|---|
| ```
void top(char input[4])
{
    int cnt = 0;
    if(input[0] == 'b') cnt++;
    if(input[1] == 'd') cnt++;
    if(cnt >= 2) crash( );
}
``` |

The example of Algorithm 2 has one modification relative to the example of Algorithm 1: only the first two bytes are inspected to trigger the crash. This is similar to most file formats, as almost all bugs can be triggered with very few byte changes. In some cases, the random fuzzer may be augmented to ascertain that only the first two bytes of the input are relevant and should be mutated. As a result, even the random fuzzer may be able to find a crash in Algorithm 2. This knowledge constrains the search space from $2^{32}$ to $2^{16}$, which is well within the reach of random fuzzing.

Further aspects of the subject technology are directed to a Machine Learning (ML) based approach to identify bytes which affect code coverage. This approach may adaptively find which bytes to fuzz, and which bytes to ignore in arbitrary file formats. Some aspects use a supervised machine learning model to predict a "heatmap" function which denotes which bytes are worth fuzzing and which should be ignored. This model is trained and utilized in a tight online-learning loop.

The ML Model advises the execution of the binary by restricting which portions of the input file to fuzz, and the feedback from the execution informs which portions of the file yielded interesting executions. In some cases, the ML Model learns to ignore portions of the input for which no change has yielded new or interesting code coverage. This "veto" approach restricts the input bytes which are considered suitable for fuzzing by learning from previous executions.

During execution, a fuzzer takes an input file and mutates some number of bytes of that file. The byte mutations which increase code coverage are noted, and a code coverage bitmap is generated. A code coverage bitmap is a {0, 1} bit sequence of the same size as the binary being executed. The code coverage bitmap of an execution denotes which instructions were executed at least once (1), or never (0).

It should be noted that any random fuzzer may be augmented with some of the techniques of the subject technology.

Some aspects of the subject technology define a metric called unidirectional hamming distance over bitmaps. The unidirectional exclusive-or operator $\{\oplus_\mu\}$ is a bitwise operation of the truth table shown in Table 1.

TABLE 1

| Unidirectional Exclusive Or Truth Table, with: A $\oplus_\mu$ B = C. | | |
|---|---|---|
| A | B | C |
| FALSE | FALSE | FALSE |
| FALSE | TRUE | TRUE |
| TRUE | FALSE | FALSE |
| TRUE | TRUE | FALSE |

The unidirectional exclusive or function is interested in whether a bit that was previously unset became set. In the overarching picture of bitmap coverage, reaching a piece of code which was previously unreachable is interesting for fuzzing purposes. Because some aspects aim to maximize code coverage, we are interested in mutations which cause sonic new piece of code to be executed.

Some aspects of the subject technology are directed to the idea of whether it is possible to use machine learning to learn a strategy for guiding the input mutations based on patterns in input bytes and code coverage information. More specifically, some aspects run the traditional fuzzing techniques for a limited time to obtain data regarding which mutations lead to new code coverage, and then use this data to learn a function to guide further input modifications towards generating promising new inputs. Although this technique is applicable to any fuzzing system, it may be instantiated on a blackbox or greybox fuzzer. The fuzzer performs random mutations to a set of seed input files, and maintains an input queue of promising new input files that lead to execution of new code paths. Since it may be difficult to precisely mutate the input files using random mutations, typically millions of newly generate inputs are discarded and only a handful of them (in the input queue) are considered for future mutations. The technique of some aspects aims to learn to guide this process of input generation to minimize the time spent on generating unpromising inputs, thereby increasing the chance of the fuzzer to cover new code paths.

Some aspects use different neural network architectures to learn a function that predicts the expected code coverage map given a set of input modifications. Since input files can be of varying lengths, architectures such as LSTM (Long Short Term Memory) and sequence2sequence with attention may be used. At fuzzing time, the learned function is used to predict a coverage map for the complete input tile, which corresponds to likelihood of mutations of each byte leading to new code coverage. Some aspects then use the coverage map to prioritize the mutation locations. For training these functions, the fuzzing algorithm is first run on a subset of seed files for a limited time, and the training data for mutation-coverage information is obtained.

Fuzz testing is a dynamic analysis technique to discover software faults. Fuzz testing a target binary involves crafting malicious input which causes the binary to misbehave unexpectedly. This misbehavior could be in the form of a crash, buffer overflow, or unhandled exception. Many fuzzers exist which perform fuzz testing in various ways. Fuzzers are typically invoked on parsers which take input such as document viewers and media players. Security vulnerabilities for these executables are especially severe due to their propensity to receive entrusted user input. A fuzzing session is started with a small number of seed files: files which the target binary can expect to parse during normal operation. These seed files can contain validly formatted input, as well as input which triggers error handling cases. A fuzzer then mutates seed files to trigger latent bugs in the binary. One goal of the fuzzer is to find bugs, however it is difficult to optimize for this objective function. Fuzzers instead attempt to maximize code coverage, or exercise specific pieces of code in the hope of finding bugs.

Fuzzers come in varieties such as blackbox, greybox, and whitebox. Blackbox fuzzers treat the target binary as a black box with no binary inspection. In contrast, whitebox fuzzers analyze source code to generate mutations which target specific pieces of code. Greybox fuzzers draw a compromise between the two with limited binary instrumentation, typically in the form of code coverage inspection. While mutation strategies differ across fuzzers, a simple fuzzer can be thought to have the fuzzing algorithm shown in Algorithm 3.

Algorithm 3: Pseudocode description of a typical blackbox fuzzing algorithm.

```
Algorithm: Simple Fuzzing
begin
  Input: Seed
  Result: MaliciousInputs
  for: iterations ← 0 to limit do
    input ← Seed
    mutations ← RandInt(len(Seed))
    for mut ← 0 to mutations do
      byte ← RandInt(len(Seed))
      mutate(input,byte)
    end
    result ← ExecuteBinary(input)
    if result is crash then
      Append input to MaliciousInputs
    end
  end
end
```

There is no clear best type of fuzzer. A blackbox fuzzer may outperform whitebox fuzzer on buggy code with many "low-hanging" bugs. Improvements to simple fuzzers are useful because, in practice, simple strategies find more bugs than complex strategies.

A fuzzing algorithm instruments source code during compilation to gain access to code coverage during execution. The frizzing algorithm attempts to maximize code coverage. Its mutation strategy is simple: attempt many small localized changes to the seed files, as well as some stacking changes which mutate many locations in the input simultaneously. However, a strength of some fuzzing algorithms lies in their genetic algorithms. During execution of the target binary, the fuzzing algorithm may observe the code coverage that a mutated input induces. A mutated input is considered interesting if it induces some never before seen piece of code to be executed, or if it changes the frequency of execution of a previously seen code block. This is referred to as "input gain" The fuzzing algorithm may save mutated inputs. This may induce an input gain. The fuzzing algorithm may treat the mutated inputs as further seed files to mutate. This constant evolution of the seed pool helps reach many obscure code paths which require iterated small changes to an input. This pool is also frequently culled to pick the best seeds to mutate for even further input gain.

For training the model, the data elements of Table 2 from an instrumented fuzzer may be used. Note that these data elements are used in a greybox fuzzers. Greybox fuzzers operate by taking some input file, and repeatedly mutating it to produce new code coverage paths. Most greybox fuzzers require no additional instrumentation to generate these data pairs. Blackbox fuzzers can be easily augmented to generate code coverage information for the target binary.

TABLE 2

Data elements from an instrumented fuzzer x: The input file being fuzzed
b: Code coverage bitmap yielded by executing the target binary on x
x': The mutated input file
b': Code coverage bitmap yielded by executing the target binary on x'

Quantitative techniques may be used to identify useful bytes to increase code coverage. Some aspects of the subject technology are directed to simple machine learning techniques which can identify useful bytes using only input and code coverage pairs.

Some aspects include a fuzzer, and a model which highlights useful bytes. During runtime, the fuzzer queries the model for each input and focuses mutations on the highlighted bytes.

Figure 3:
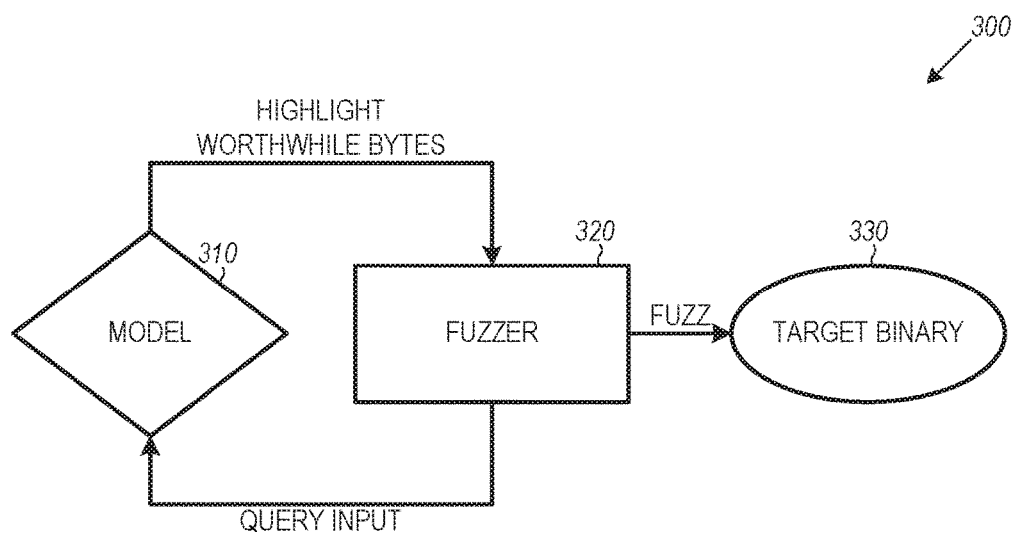
FIG. 3 is a first data flow diagram for constrained mutation-based fuzz testing, in accordance with some embodiments.

FIG. 3 is a first data flow diagram 300 for constrained mutation-based fuzz testing, in accordance with some embodiments. The first data flow diagram 300 includes a model 310 (e.g., corresponding to the fuzzing algorithm controller 120), a fuzzer 320 (e.g., corresponding to the frizzing algorithm 125), and a target binary 330 (e.g., corresponding to the input file 135). As shown in FIG. 3, the model 310 highlights worthwhile bytes for the fuzzer 320. The fuzzer 320 queries the input from the model 310. The fuzzer 320 fuzzes the target binary 330.

The model given an input file in sequence-of-bits format should ideally produce a sequence of useful positions to fuzz: $\forall k \cdot \{0, 1\}^k \leftrightarrows [k]^*$. However, in practice, this is difficult for a model to learn. An approximation of the above may be provided with a heatmap function, shown in Equation 1.

$$f: \forall k \cdot \{0,1\}^k \leftrightarrows [0,1]^k \qquad \text{Equation 1}$$

Equation 1 associates each position with the probability of a mutation yielding an input gain. Moreover the magnitude at each position divulges the relative efficacy of mutation yielding input gain.

As shown in FIG. 3, the fuzzer 320 queries this model 310 during augmented execution. Before mutating a given input for the first time, the model 310 is queried for this input. The resultant heatmap is used to guide mutation towards usefull positions. In some examples, the phrase "useful positions" in an input file refers to heatmap positions with a non-zero quantity: positions which were involved in at least one useful mutation. Useful positions are defined in Equation 2

$$\Sigma(\text{cutoff}_\beta(f'(x)) \wedge (x \text{ XOR } x')) > \alpha \qquad \text{Equation 2}$$

In Equation 2, x=input file to fuzz; x'=mutated input; XOR=bitwise exclusive-or; α denotes some fixed cutoff parameter in [0,1]; cutoff$_\beta$ denotes the element-wise cutoff function on $[0,1]^k$ returning 1 for each element greater than β and 0 otherwise, for some fixed parameter $\beta \in [0,1]$. It should be noted that some of the equations are example instantiations of some aspects of the subject technology, and not the subject technology itself. Some of the equations describe the engineering that makes some aspects of the subject technology work in practice.

Potential mutations which target no useful bytes are vetoed during augmented execution. Some aspects do not waste time executing the binary and analyzing results on mutated inputs which are unlikely to give input gain. One possible advantage of augmented execution comes from avoiding useless mutations.

In some cases, the proposed approach gives improvements on some target binaries. Furthermore the model requires only input, code coverage tuples for training. This approach may be easy to integrate with some blackbox or greybox fuzzers, which provide input and code coverage tuples.

Some aspects are directed to deciding how to train f' with limited data. It is clear that a lack of change in code coverage indicates mutations applied to useless bytes. In some cases, there is no straightforward method to determine useful bytes through input, code coverage tuples. A general framework for training based on some scoring of b, b' is shown in Equation 3.

$$f(x) = x \oplus x' \text{ iff } s((b,b')) > \alpha \qquad \text{Equation 3}$$

One result of the above approach is that useless mutations are scored lower than the useful mutations. f points to the useful bytes with scores over α. A model learning f will receive multiple x, x' pairs in a supervised setting. To optimize some form of classification loss, f will learn to hedge its' bets as a singular x may have many mutations x' which yield good scores. To minimize the aggregate loss over this "one-to-many" relationship, f learns the mean of the binomial variable $x'=x'_0, x'_1, \ldots, x'_k$. This demonstrates the relative usefulness of flipping bytes at given positions. The bytes which are seldom involved in an input gaining mutation will be lower than sonic threshold α. This may result in some binary categorization over useful bytes.

In principle, an effective incarnation of s(b, b') is difficult. s(b, b') must distinguish mutations which cause input gain. However, input gain depends on the presence of "never-before-seen" execution behavior. The sequential dependency on fuzzing history requires a function, s* also conditioned on the same. A function of this type may be difficult for machine learning models to learn. Some aspects provide an approximation of s*, as shown in Equation 4.

$$s(b,b') = b \oplus_\mu b' \qquad \text{Equation 4}$$

In Equation 4, $\oplus_\mu$ represents the Unidirectional Hamming Function or unidirectional exclusive-or function. The truth table for this function is shown in Table 1, above.

It should be noted that the Unidirectional Hamming Function is similar, but not identical, to a strict exclusive-or function. The Unidirectional Hamming Function used as a scoring function, which highlights code sections which are not executed in b, but are executed in b'. A small mutation in the header or magic bytes section of x induces a very sparse b'. It is unlikely that the Hamming distance metric is suitable due to this reason. The Unidirectional Hamming Function attempts to apply a "low-pass filter" to the noisy Hamming distance metric to highlight locations which are key for some code block.

An implementation of some aspects of the subject technology may include a model and augmentations to a frizzing algorithm.

The fuzzing algorithm may be augmented for use with some aspects. The augmented fuzzing algorithm may query a neural network model with each input prior to fuzzing. The neural model categorize the input into useful and useless section with byte granularity. This query strategy is illustrated in FIG. 4.

Figure 4:
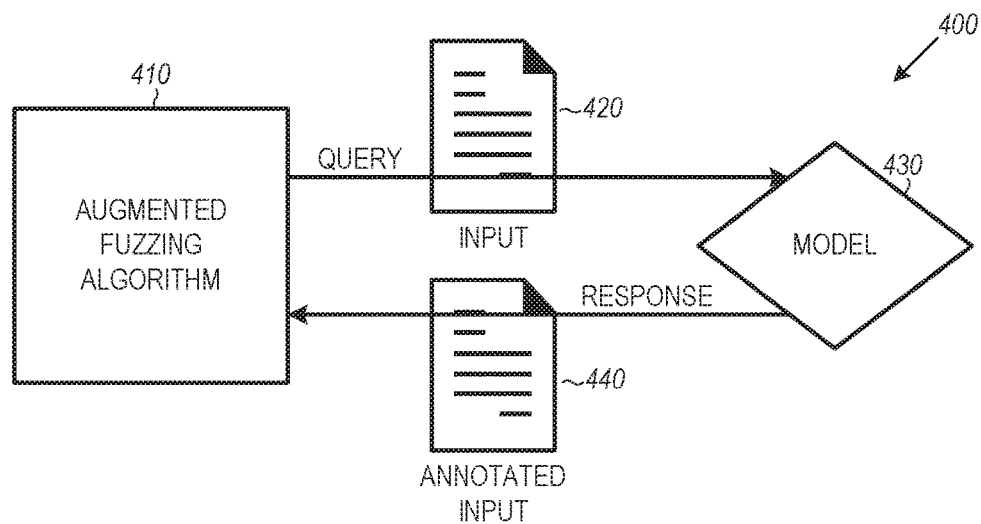
FIG. 4 is a second data flow diagram for constrained mutation-based fuzz testing, in accordance with some embodiments.

FIG. 4 is a second data flow diagram 400 for constrained mutation-based fuzz testing, in accordance with some embodiments. As shown, the second data flow diagram 400 includes the augmented fuzzing algorithm 410 (corresponding to the fuzzer 320 or the fuzzing algorithm 125), the model 430 (corresponding to the model 310 or the fuzzing algorithm controller 120), the input 420 (e.g., corresponding to the target binary 330 or the input file 135), and the annotated input 440. The annotated input 440 highlights bytes which yield input gain (increases in code coverage), and may correspond to the input file 135 coupled with the heatmap 145. As shown in FIG. 4, the augmented fuzzing algorithm 410 queries the model 430 with the input 420. The model 430 provides to the augmented frizzing algorithm 410, as a response to the query, the annotated input 440.

The categorization is used during fuzzing. The fuzzing strategy applies the localized changes shown in Table 3. It should be noted that that the mutations of Table 3 may be performed on sequential sections.

TABLE 3

Example Mutations

Bit flips: Mutate the input by flipping [1/2/4] bit(s) at a time.
Byte flips: Mutate the input by xor'ing [1/2/4] byte(s) with 0xFF.
Arithmetic mutations: Mutate the input by adding/subtracting interesting quantities at [1/2/4] byte granularities.
Interesting substitutions: Mutate the input by splicing an "interesting" value at [1/2/4] byte granularities.
Dictionary substitutions: Mutate the input by replacing bytes with user supplied "interesting" values. These may be longer than 4 bytes in length.

All the mutations of Table 3 are small and localized changes of which there are finitely many for a give input. After the conclusion of this phase, the fuzzing algorithm begins stacking many of these small localized changes which are non-local and of significant Hamming distance with respect to the input. The fuzzing algorithm may apply somewhere between two and 128 stacking changes chosen uniformly. The previously mentioned small localized changes form some of the base changes. In addition the mutations shown in Table 4 may also be applied.

TABLE 4

Example Mutations

Random byte assignment: Assign a random value to a random byte.
Delete bytes: Delete a section of the input file.
Clone bytes: Append bytes to a section of the input file.
Overwrite bytes: Overwrite a section of the input file Due to the location and context insensitive nature of fuzzing, most mutations yield no input gain. One goal of augmented fuzzing is to improve the hit-rate of mutations. Consulting the annotated input given by the model, some aspects can avoid mutations which are unlikely to give input gain. Some aspects implement a highly permissive veto approach to reject mutations which target no useful bytes.

In some aspects, a function from the family of Equation 1 (above) is to be learned. Due to the arbitrary length and sequential nature of the input, Recurrent Neural Network (RNN) may be used. Each input file is sequential data which is most likely parsed sequentially by the target binary. RNNs are able to count. This is useful in annotating file formats which contain header information at fixed offsets. RNNs have been used in Statistical Machine Translation, and this task is similar since binary file formats can be considered a form of language.

Some aspects implement Long Short-Term Memory (LSTM) as the base recurrent unit. LSTMs extend the memory capability of a recurrent unit to longer sequences. This is accomplished by a separate pathway for the flow of memory. LSTMs can also "forget" memories that have outlived their usefulness which allows more expressiveness for longer sequences. Recall that a recurrent unit is defined as shown in Equation 5.

$$h_t = f(x_t, h_{t-1}) \quad \text{Equation 5}$$

An LSTM decomposes the overall framework of Equation 5 into the subcomponents of Equation 6-9.

$$f_t = \sigma(W_f[x_t, h_{t-1}] + b_f) \quad \text{Equation 6}$$

$$i_t = \sigma(W_i[x_t, h_{t-1}] + b_i) \quad \text{Equation 7}$$

$$C_t = f_t * C_{t-1} + i_t * \tanh(W_c[x_t, h_{\{t-1\}}] + b_c) \quad \text{Equation 8}$$

$$o_t = \tanh C_t * \sigma(W_O[x_t, h_{t-1}] + b_0) \quad \text{Equation 9}$$

The forget gate $f_t$, and the input gate $i_t$ control whether old memory is forgotten, and whether the current input is worth remembering. This interplay allows the memory information of LSTMs to persist through longer sequences.

The architectures of Table 5 may be used with the subject technology.

TABLE 5

Architectures

LSTM: A simple unidirectional LSTM.
Bidirectional LSTM: A bidirectional LSTM which sees the input backwards and forwards.
Seq2Seq: Sequence-to-sequence architecture.
Seq2Seq + Attn: Sequence to sequence with attention.

Bidirectional LSTMs see the input in backward and forward order, as shown in Equation 10.

$$h_t = \text{Merge}(\vec{f}(x_t, h_{t-1}), \overleftarrow{f}(x_t, h_{t-1})) \quad \text{Equation 10}$$

The recurrence relation of Equation 10 is satisfied by two unidirectional LSTMs, one in each forward and backward direction. Given a length n sequence, to compute the values for timestep t, the forward LSTM's $h_{t-1}$ and the backward LSTM's $h_{n-t-1}$ are used in conjunction. The Merge function can be one of many functions combining two like sized vectors such as sum, multiply, or concatenate. Some aspects use the sum function for one layer Bidirectional LSTMs, and the concatenate function for two layer or more LSTMs.

in some aspects, one layer bidirectional LSTMs uses a sum merge function, while two layer bidirectional LSTM use a concatenate function. The second layer of the two layer bidirectional LSTM is a unidirectional LSTM. Seq2Seq and Seq2Seq+Attn are comprised of one encoding and one decoding layer. The encoding layer is a bidirectional LSTM which was merged using the concatenate function.

Components and Logic

Certain embodiments are described herein as including logic or a number of components or mechanisms, Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

In some embodiments, a hardware component may be implemented mechanically, electronically, or any suitable combination thereof. For example, a hardware component may include dedicated circuitry or logic that is permanently configured to perform certain operations. For example, a hardware component may be a special-purpose processor, such as a Field-Programmable Gate Array (FPGA) or an Application Specific Integrated Circuit (ASIC), A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations, Accordingly, the phrase "hardware component" should be understood to encompass a tangible record, be that a record that is physically constructed, permanently configured (e.g., hardwired), or temporarily configured (e.g., programmed) to operate in a certain manner or to perform certain operations described herein. As used herein, "hardware-implemented component" refers to a hardware component. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors.

Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API).

The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

Example Machine and Software Architecture

The components, methods, applications, and so forth described in conjunction with FIGS. 1.-4 are implemented in some embodiments in the context of a machine and an associated software architecture. The sections below describe representative software architecture(s) and machine (e.g., hardware) architecture(s) that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things," while yet another combination produces a server computer for use within a cloud computing architecture. Not all combinations of such software and hardware architectures are presented here, as those of skill in the art can readily understand how to implement the disclosed subject matter in different contexts from the disclosure contained herein.

Figure 5:
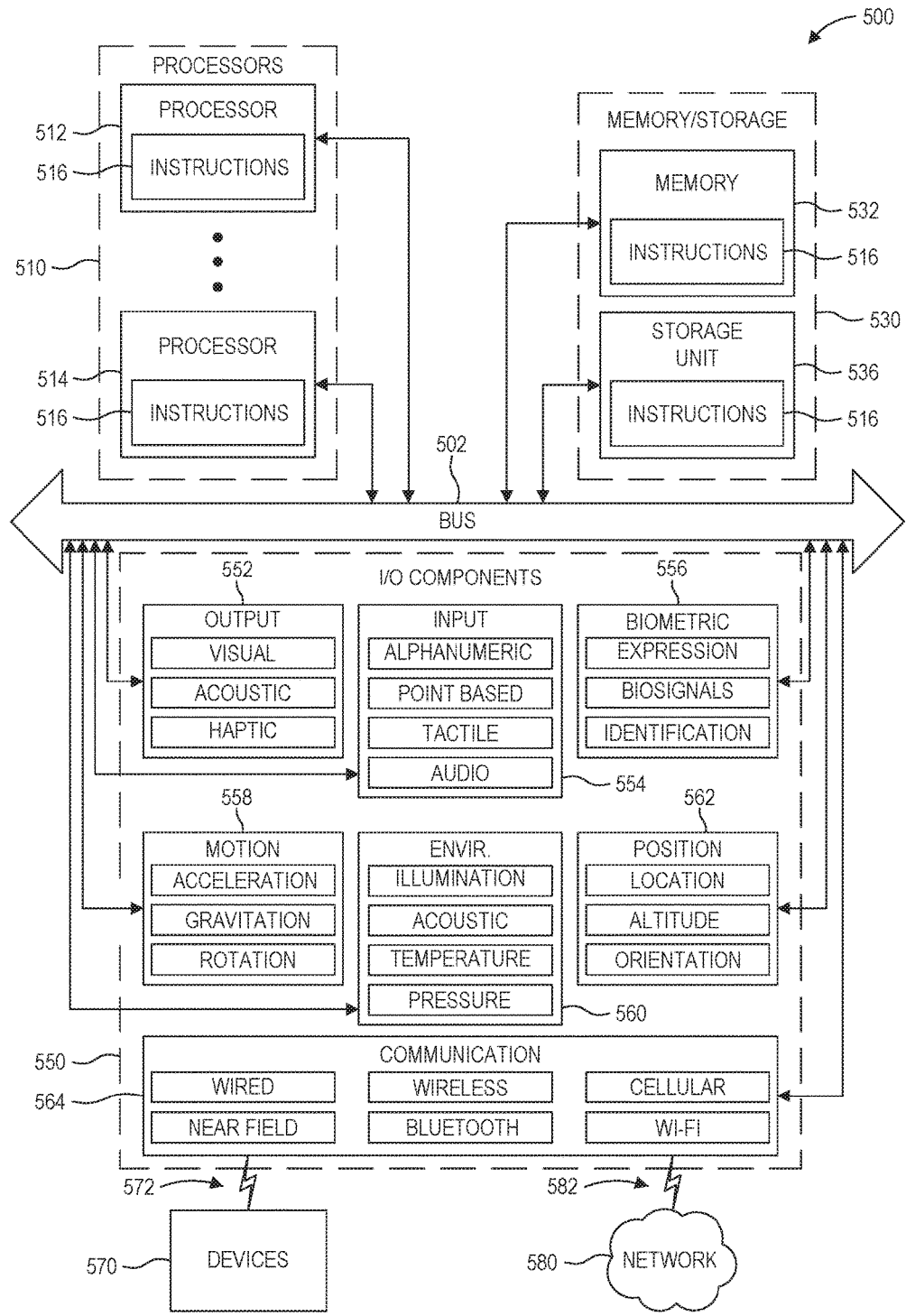
FIG. 5 is a block diagram illustrating components of a machine able to read instructions from a machine-readable medium and perform any of the methodologies discussed herein, in accordance with some embodiments.

FIG. 5 is a block diagram illustrating components of a machine 500, according to some example embodiments, able to read instructions from a machine-readable medium (e.g., a machine-readable storage medium) and perform any one or more of the methodologies discussed herein. Specifically, FIG. 5 shows a diagrammatic representation of the machine 500 in the example form of a computer system, within which instructions 516 (e.g., software, a program, an application, an applet, an app, or other executable code) for causing the machine 500 to perform any one or more of the methodologies discussed herein may be executed. The instructions 516 transform the general, non-programmed machine into a particular machine programmed to carry out the described and illustrated functions in the manner described. In alternative embodiments, the machine 500 operates as a standalone device or may be coupled (e.g., networked) to other machines. In a networked deployment, the machine 500 may operate in the capacity of a server machine or a client machine in a server-client network environment, or as a peer machine in a peer-to-peer (or distributed) network environment. The machine 500 may comprise, but not be limited to, a server computer, a client computer, PC, a tablet computer, a laptop computer, a netbook, a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 516, sequentially or otherwise, that specify actions to be taken by the machine 500. Further, while only a single machine 500 is illustrated, the term "machine" shall also be taken to include a collection of machines 500 that individually or jointly execute the instructions 516 to perform any one or more of the methodologies discussed herein.

The machine 500 may include processors 510, memory/storage 530, and I/O components 550, which may be configured to communicate with each other such as via a bus 502. In an example embodiment, the processors 510 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 512 and a processor 514 that may execute the instructions 516. The term "processor" is intended to include multi-core processors that may comprise two or more independent processors (sometimes referred to as "cores") that may execute instructions contemporaneously. Although FIG. 5 shows multiple processors 510, the machine 500 may include a single processor with a single core, a single processor with multiple cores (e.g., a multi-core processor), multiple processors with a single core, multiple processors with multiples cores, or any combination thereof.

The memory/storage 530 may include a memory 532, such as a main memory, or other memory storage, and a storage unit 536, both accessible to the processors 510 such as via the bus 502. The storage unit 536 and memory 532 store the instructions 516 embodying any one or more of the methodologies or functions described herein. The instructions 516 may also reside, completely or partially, within the memory 532, within the storage unit 536, within at least one of the processors 510 (e.g., within the processor's cache memory), or any suitable combination thereof, during execution thereof by the machine 500. Accordingly, the memory 532, the storage unit 536, and the memory of the processors 510 are examples of machine-readable media.

As used herein, "machine-readable medium" means a device able to store instructions (e.g., instructions 516) and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store the instructions 516. The term "machine-readable medium" shall also be taken to include any medium, or combination of multiple media, that is capable of storing instructions (e.g., instructions 516) for execution by a machine (e.g., machine 500), such that the instructions, when executed by one or more processors of the machine (e.g., processors 510), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 550 may include a wide variety of components to receive input, provide output, produce output, transmit information, exchange information, capture measurements, and so on. The specific I/O components 550 that are included in a particular machine will depend on the type of machine. For example, portable machines such as mobile phones will likely include a touch input device or other such input mechanisms, while a headless server machine will likely not include such a touch input device. It will be appreciated that the I/O components 550 may include many other components that are not shown in FIG. 5. The I/O components 550 are grouped according to functionality merely for simplifying the following discussion and the grouping is in no way limiting. In various example embodiments, the I/O components 550 may include output components 552 and input components 554. The output components 552 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth, The input components 554 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 550 may include biometric components 556, motion components 558, environmental components 560, or position components 562, among a wide array of other components. For example, the biometric components 556 may include components to detect expressions (e.g., hand expressions, facial expressions, vocal expressions, body gestures, or eye tracking), measure biosignals (e.g., blood pressure, heart rate, body temperature, perspiration, or brain waves), measure exercise-related metrics (e.g., distance moved, speed of movement, or time spent exercising) identify a person (e.g., voice identification, retinal identification, facial identification, fingerprint identification, or electroencephalogram based identification), and the like. The motion components 558 may include acceleration sensor components (e.g., accelerometer), gravitation sensor components, rotation sensor components e.g., gyroscope), and so forth. The environmental components 560 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 562 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 550 may include communication components 564 operable to couple the machine 500 to a network 580 or devices 570 via a coupling 582 and a coupling 572, respectively. For example, the communication components 564 may include a network interface component or other suitable device to interface with the network 580. In further examples, the communication components 564 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 570 may be another machine or any of a wide variety of peripheral devices (e.g., a peripheral device coupled via a USB).

Moreover, the communication components 564 may detect identifiers or include components operable to detect identifiers. For example, the communication components 564 may include Radio Frequency Identification (RFID) tag reader components, NFC smart tag detection components, optical reader components, or acoustic detection components (e.g., microphones to identify tagged audio signals). In addition, a variety of information may he derived via the communication components 564, such as location via Internet Protocol (IP) geolocation, location via Wi-Fi® signal triangulation, location via detecting an NFC beacon signal that may indicate a particular location, and so forth.

In various example embodiments, one or more portions of the network 580 may be an ad hoc network, an intranet, an extranet, a virtual private network (VPN), a local area network (LAN), a wireless LAN (WLAN), a WAN, a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 580 or a portion of the network 580 may include a wireless or cellular network and the coupling 582 may be a Code Division Multiple Access (CDMA) connection, a Global System for Mobile communications (GSM) connection, or another type of cellular or wireless coupling. In this example, the coupling 582 may implement any of a variety of types of data transfer technology, such as Single Carrier Radio Transmission Technology (1xRTT), Evolution-Data Optimized (EVDO) technology, General Packet Radio Service (CPRS) technology, Enhanced Data rates for GSM Evolution (EDGE) technology, third Generation Partnership Project (3GPP) including 5G, fourth generation wireless (4G) networks, Universal Mobile Telecommunications System (UMTS), High Speed. Packet Access (HSPA), Worldwide Interoperability for Microwave Access (WiMAX), Long Term Evolution (LTE) standard, others defined by various standard-setting organizations, other long range protocols, or other data transfer technology.

The instructions 516 ray be transmitted or received over the network 580 using a transmission medium via a network interface device (e.g., a network interface component included in the communication components 564) and utilizing any one of a number of well-known transfer protocols (e.g., HTTP), Similarly, the instructions 516 may be transmitted or received using a transmission medium via the coupling 572 (e.g., a peer-to-peer coupling) to the devices 570. The term "transmission medium" shall be taken to include any intangible medium that is capable of storing, encoding, or carrying the instructions 516 for execution by the machine 500, and includes digital or analog communications signals or other intangible media to facilitate communication of such software.

What is claimed is:

1. A system comprising:
one or more processors; and
a memory comprising instructions which, when executed by the one or more processors, cause the one or more processors to perform operations comprising:
   accessing an input file of code for testing, the input file comprising a plurality of bytes;
   performing a plurality of runs of a fuzzing algorithm using the input file and the code for testing, each run including: performing a mutation of one or more bytes of the input file and determining which parts of the code for testing were executed when the code was run with the mutated input file;
   storing, for each run of the plurality of runs of the fuzzing algorithm, an indication of whether the mutation caused execution of a portion of the code for testing which was not executed prior to the mutation;
   tailoring the fuzzing algorithm based on the stored indications;
   executing the tailored fuzzing algorithm to identify one or more versions of the input file for which the code for testing crashes;
   providing, as a digital transmission, indicia of the one or more versions of the input file for which the code for testing crashes; and
   generating a heatmap of the input file based on the stored indications, the heatmap mapping each of the plurality of bytes in the input file to a value indicating whether the mutation of the byte caused execution of the portion of the code for testing which was not executed prior to the mutation,
   wherein tailoring the fuzzing algorithm based on the stored indications comprises tailoring the fuzzing algorithm based on the heatmap.

2. The system of claim 1, wherein tailoring the fuzzing algorithm based on the heatmap comprises:
   adjusting the fuzzing algorithm to perform mutations only on bytes associated, in the heatmap, with either a value exceeding a threshold, a non-zero value, or a TRUE value.

3. The system of claim 1, wherein the heatmap comprises a matrix identifying each byte of the input file and the value indicating whether the mutation of that byte caused execution of the portion of the code for testing which was not executed prior to the mutation.

4. The system of claim 1, wherein generating a heatmap of the input file based on the stored indications comprises:
   learning a machine-learned model based on the stored indications, the machine-learned model being for predicting the value indicating whether the mutation of each byte causes execution of the portion of the code for testing which was not executed prior to the mutation; and
   generating the heatmap of the input file using the machine-learned model.

5. The system of claim 1, wherein the fuzzing algorithm mutates one or more bytes in the input file to cause unexpected behavior in an execution of the code for testing.

6. The system of claim 1, wherein the code for testing is an application for processing files of a type associated with the input file.

7. The system of claim 1, wherein the value indicating whether the mutation of the byte caused execution of the portion of the code for testing which was not executed prior to the mutation is:

one or TRUE if, in at least one instance, the mutation of the byte caused execution of the portion of the code for testing which was not executed prior to the mutation, and zero or FALSE otherwise.

8. The system of claim 1, wherein the value indicating whether the mutation of the byte caused execution of the portion of the code for testing which was not executed prior to the mutation corresponds to a proportion, of runs where the byte had the mutation, which caused execution of the portion of the code for testing which was not executed prior to the mutation.

9. A non-transitory machine-readable medium comprising instructions which, when executed by one or more processors of a machine, cause the one or more processors to perform operations comprising:

performing a plurality of runs of a fuzzing algorithm using an input file and code for testing, the input file comprising a plurality of bytes, and each run including:
performing a mutation of one or more bytes of the input file and determining which parts of the code for testing were executed when the code was run with the input file;

storing, for each run of the plurality of runs of the fuzzing algorithm, an indication of whether the mutation caused execution of a portion of the code for testing which was not executed prior to the mutation;

generating a heatmap of the input file based on the stored indications, the heatmap mapping each of the plurality of bytes in the input file to a value indicating whether the mutation of the byte caused execution of the portion of the code for testing which was not executed prior to the mutation;

tailoring the fuzzing algorithm based on the heatmap;

executing the tailored fuzzing algorithm to identify one or more versions of the input file for which the code for testing crashes; and providing, as a digital transmission, indicia of the one or more versions of the input file for which the code for testing crashes.

10. The machine-readable medium of claim 9, wherein the fuzzing algorithm mutates one or more bytes in the input file to cause unexpected behavior in an execution of the code for testing.

11. The machine-readable medium of claim 9, wherein the code for testing is an application for processing files of a type associated with the input file.

12. The machine-readable medium of claim 9, wherein tailoring the fuzzing algorithm based on the heatmap comprises:

adjusting the fuzzing algorithm to perform mutations only on bytes associated, in the heatmap, with either a value exceeding a threshold, a non-zero value, or a TRUE value.

13. The machine-readable medium of claim 9, wherein the value indicating whether the mutation of the byte caused execution of the portion of the code for testing which was not executed prior to the mutation is:

one or TRUE if, in at least one instance, the mutation of the byte caused execution of the portion of the code for testing which was not executed prior to the mutation, and zero or FALSE otherwise.

14. The machine-readable medium of claim 9, wherein the value indicating whether the mutation of the byte caused execution of the portion of the code for testing which was not executed prior to the mutation corresponds to a proportion, of runs where the byte had the mutation, which caused execution of the portion of the code for testing which was not executed prior to the mutation.

15. The machine-readable medium of claim 9, wherein the heatmap comprises a matrix identifying each byte of the input file and the value indicating whether the mutation of that byte caused execution of the portion of the code for testing which was not executed prior to the mutation.

16. The machine-readable medium of claim 9, wherein generating a heatmap of the input file based on the stored indications comprises:

learning a machine-learned model based on the stored indications, the machine-learned model being for predicting the value indicating whether the mutation of each byte causes execution of the portion of the code for testing which was not executed prior to the mutation; and generating the heatmap of the input file using the machine-learned model.

17. A method comprising:

accessing an input file of code for testing, the input file comprising a plurality of bytes;

performing a plurality of runs of a fuzzing algorithm using the input file and the code for testing, each run including:

performing a mutation of one or more bytes of the input file and determining which parts of the code for testing were executed when the code was run with the input file;

storing, for each run of the plurality of runs of the fuzzing algorithm, an indication of whether the mutation caused execution of a portion of the code for testing which was not executed prior to the mutation;

generating a heatmap of the input file based on the stored indications, the heatmap mapping each of the plurality of bytes in the input file to a value indicating whether the mutation of the byte caused execution of the portion of the code for testing which was not executed prior to the mutation;

tailoring the fuzzing algorithm based on the heatmap; and providing, as a digital transmission, an output of the tailored fuzzing algorithm.

18. The method of claim 17, further comprising:

executing the tailored fuzzing algorithm to identify one or more versions of the input file for which the code for testing crashes; and providing, as a digital transmission, indicia of the one or more versions of the input file for which the code for testing crashes.

19. The method of claim 17, wherein tailoring the fuzzing algorithm based on the heatmap comprises:

adjusting the fuzzing algorithm to perform mutations only on bytes associated, in the heatmap, with either a value exceeding a threshold, a non-zero value, or a TRUE value.

* * * * *